O. ALTPETER.
MACHINE FOR MAKING COMPOSITE SHINGLES.
APPLICATION FILED OCT. 13, 1919.
1,352,931.
Patented Sept. 14, 1920.
3 SHEETS—SHEET 1.
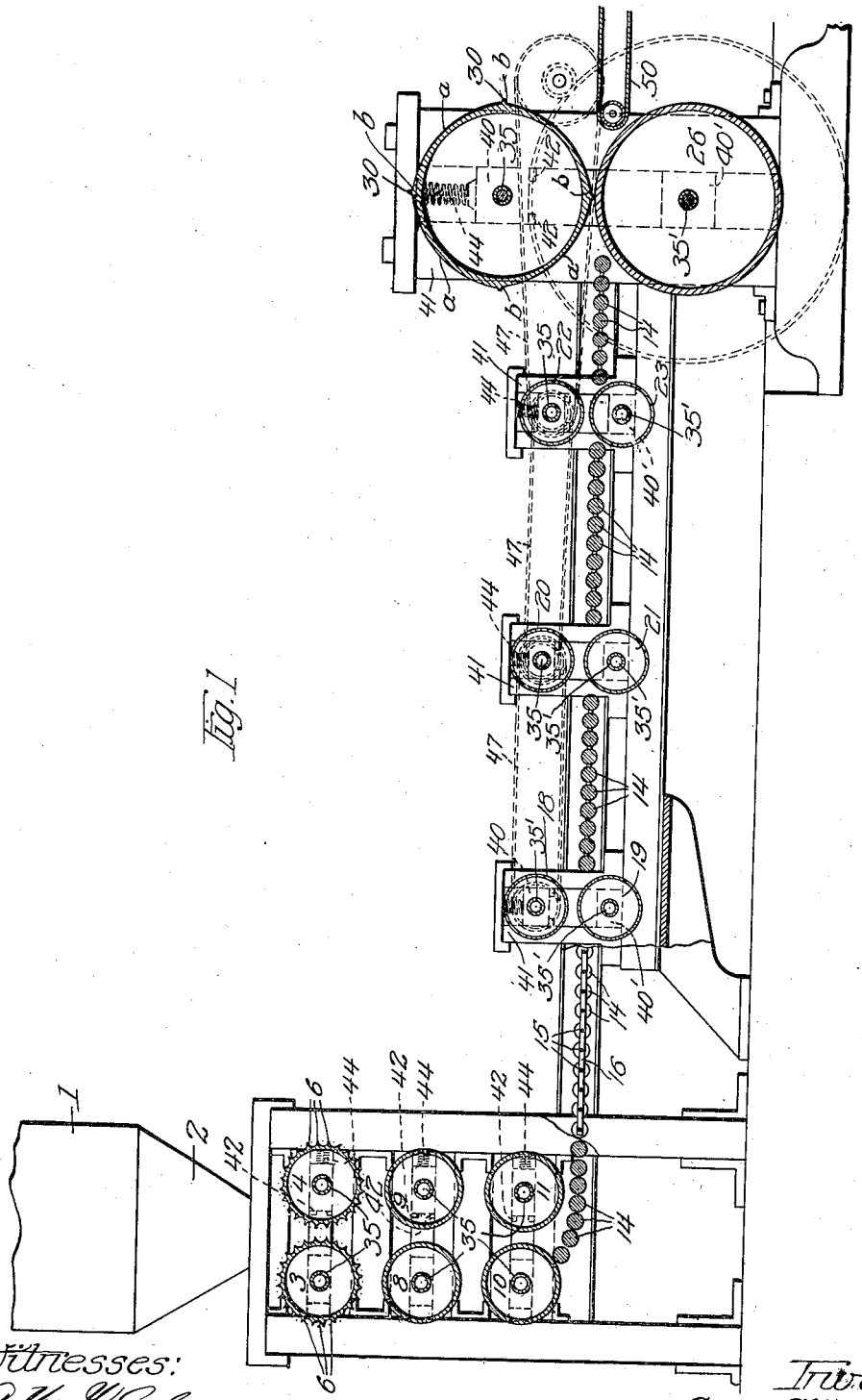

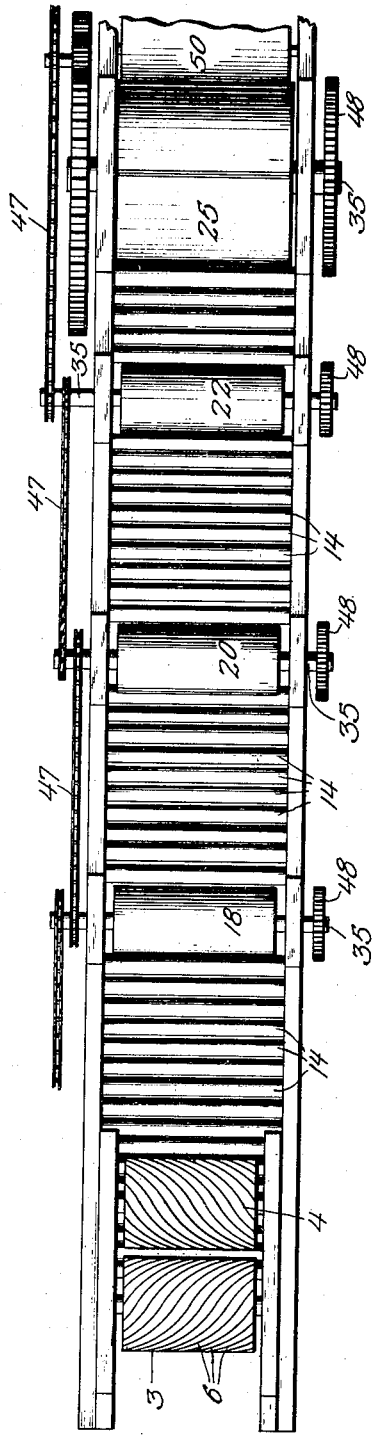

O. ALTPETER.
MACHINE FOR MAKING COMPOSITE SHINGLES.
APPLICATION FILED OCT. 13, 1919.
1,352,931.
Patented Sept. 14, 1920.
3 SHEETS—SHEET 3.
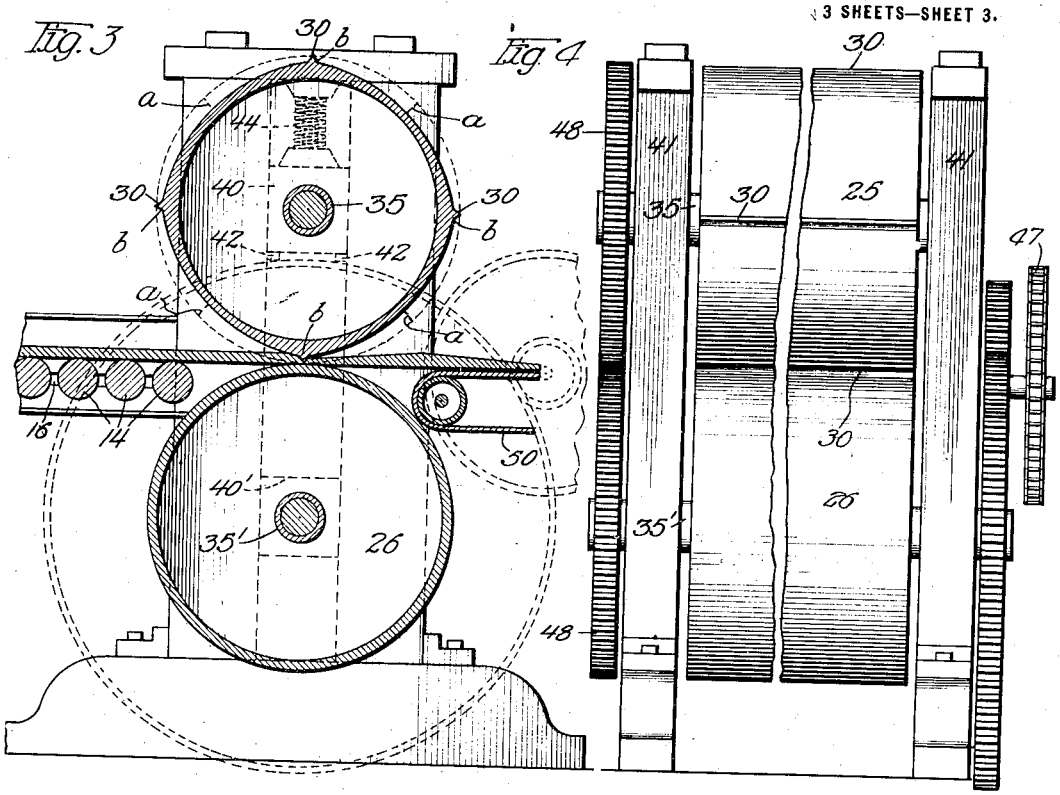
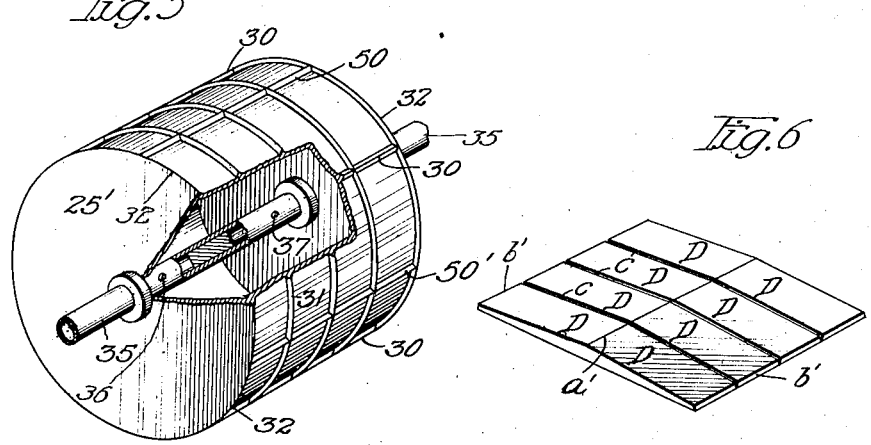
Witnesses:
Arthur W. Carlson
Robert H. Weir
Inventor
Oscar Altpeter
by Jabel & Mueller
Attys.

UNITED STATES PATENT OFFICE.

OSCAR ALTPETER, OF MILWAUKEE, WISCONSIN.

MACHINE FOR MAKING COMPOSITE SHINGLES.

1,352,931.  Specification of Letters Patent.  Patented Sept. 14, 1920.

Substitute for application Serial No. 83,714, filed March 13, 1916. This application filed October 13, 1919. Serial No. 330,249.

*To all whom it may concern:*

Be it known that I, OSCAR ALTPETER, a citizen of the United States, residing at Milwaukee, in the county of Milwaukee and State of Wisconsin, have invented a certain new and useful Improvement in Machines for Making Composite Shingles, of which the following is a full, clear, concise, and exact description, reference being had to the accompanying drawings, forming a part of this specification.

My invention relates to improvements in machines for making shingles from material which is plastic, when heated.

The object of my invention is to provide means, whereby a sticky composition, such for example, as a mixture of ashes or granulated slag or any other suitable filler and fibrous material with a binder of asphaltum, tar, or other materials which become plastic when heated, may be delivered in heated condition from a carrier apron or hopper in a continuous stream and passed between series of sets of spreading and compressing rollers, without sticking to either the roller surfaces or the conveying members, and said material finally operated upon by a set of shaping cylinders while still sufficiently plastic to permit the shaping process, and yet cool enough to retain the form into which it is pressed by such cylinders. More particularly, my object is to provide a set of shaping cylinders in which the pressure upon the material is progressively increased for a definite period and then progressively decreased for an equal period, in a manner to produce alternate wave like projections and hollows in the surface of the strip of material and extending across the latter in such a manner that the strip may be cut across the thickest and thinnest portions to form a series of wedge shaped shingles of substantially the form of ordinary wooden shingles.

In the drawings—

Figure 1 is a longitudinal sectional view of a shingle forming machine embodying my invention, but with a fragment thereof illustrated in side elevation;

Fig. 2 is a plan view of the same;

Fig. 3 is an enlarged view, in longitudinal section, of the shaping cylinders and associated parts;

Fig. 4 is an end view of the same with the central portions of the cylinders broken away:

Fig. 5 is a perspective view of a shaping cylinder showing a slightly modified form of construction adapted for machines of large size; and Fig. 6 is a perspective view of a gate of shingles.

Like parts are identified by the same reference characters throughout the several views.

The material is fed from a hopper 1, wherein it is heated sufficiently to soften it until it will flow by gravity through the outlet 2 in the bottom of the hopper. This outlet is located directly over a set of feeding rollers 3 and 4, which revolve in opposite directions and carry the material downwardly between them. The surfaces of these rollers are preferably helically corrugated or ribbed. In the construction shown, these ribs 6 have comparatively sharp outer edges or margins and they freely cut into the material and carry it downwardly in measured quantities, for while, as above stated, the material is soft enough to flow through the comparatively large opening in the hopper, it will ordinarily not be soft enough to flow through the much narrower space between the rollers 3 and 4, when such rollers are stationary.

The rollers 3 and 4 operate to feed the material downwardly in the form of a sheet or strip, since the material engaged between the ribs 6 will be carried by each roller inwardly and downwardly and compressed between the rollers into sheet form. The spaces between the ribs 6 constitute broad open grooves and the adhesion of the material carried by the respective rollers is greater between different portions of the material than it is between the material and the smooth surfaces of the roller grooves. Also the helical form of the grooves and ribs constitute materially to the production of the continuous flat strip or sheet of material, since no one of the ribs tends to cut through the material along a straight line parallel to the axis of the roller. The flat strip of material which is thus delivered downwardly by the rollers 3 and 4, is of course irregular in form with ridges thereon corresponding to the grooves between the ribs 6 and showing in some instances a tendency to tear across the strip, owing to the weight of the material below it. I therefore locate a second set of rollers 8 and 9 a short distance below the rollers 3 and 4. These rollers 8 and 9 have smooth surfaces and are in closer proximity to each other than the rollers 3 and 4. The strip of material is therefore additionally compressed and flattened between these rollers, after which it is delivered to a third set of rollers 10 and 11, which are similar in form to the rollers 8 and 9, but are set even closer together. Each set of the aforementioned rolls is adjustable and the peripheral speed of each set of rolls is increased in proportion to the lengthening of the material caused by passing through the immediately preceding set of rolls.

After passing vertically between the rollers 3 and 4, 8 and 9, 10, and 11, the strip will be sufficiently hard, flat and continuous to permit bending it and feeding it along a horizontal way, composed of a series of idle rollers 14 of small diameter and preferably having trunnions 15 at each end journaled in supporting bars 16. These idle rollers 14 direct the material between additional pairs of compressing rollers 18 and 19, 20 and 21, 22 and 23 respectively, all of which, together with the vertically disposed sets of rollers above described, are driven at the proper peripheral speed and which serve to not only propel the material along the way while allowing it to cool and harden, but also subject it to an additional compressing operation to close any cracks or crevices appearing in the strip, which of course tends to tear easily while still sufficiently plastic to permit it to be shaped and pressed into homogeneous form by the action of the rollers.

After passing the set of rollers 22, 23 the strip is directed by the idle rollers 14 between a pair of shaping cylinders 25 and 26, these cylinders having a slightly less peripheral speed than the rollers 22 and 23, although they are preferably much larger in diameter. The lower cylinder 26 preferably has a true cylindrical outer surface, but the cylinder 25 has an eccentric outer surface, the radius of the periphery gradually increasing from lines $a$, parallel to the axis, to lines $b$, also parallel to the axis. After passing the lines $b$, the radius gradually decreases to the next line $a$, etc. In the construction illustrated, the inner face of this cylinder wall is circular, i. e. this face is a true cylinder. But the wall is progressively thickened from each of the four lines $a$ to each of the four lines $b$, thereby forming an outer surface which has what may be termed broad open longitudinal corrugations, each occupying one quarter of the area of the cylinder surface. Those portions which have the greatest radius and which include the lines $b$, will of course revolve in closer proximity to the cylinder 26 than the portion adjacent to and including the lines $a$, and therefore the strip of material passing between the rollers 25 and 26, will be subjected to increasing compression during relative travel of the cylinder 25 along its surface from any one of the lines $a$ to a line $b$ and will then be subjected to diminishing pressure during relative travel of the cylinder surface from the line $b$ to the next line $a$, the two rollers 25 and 26 being in sufficient proximity to subject the material to some pressure at all times.

The material reaches the rollers 25 and 26 while it is still sufficiently plastic to allow it to shift under the pressure exerted by the rollers, and inasmuch as the material is being advanced by the rollers, (the latter being positively driven), it is obvious that the material will shift longitudinally much more freely and readily than it will shift laterally, the material being crowded backwardly during the period of progressively increasing pressure, and the strip being thus thickened, preparatory to passing between the rollers during the period of decreasing pressure. The actual variation in pressure is therefore not very great on account of this preparatory thickening of those portions of the strip which register with the parts of the cylinder surface which include the lines $a$.

As the rollers 25 and 26 are preferably driven at the same peripheral speed as the rollers 22 and 23, it is desirable that the strip when it leaves the rollers 22 and 23 be of such thickness that it may still be capable of thinning out due to the action of the rollers 25 and 26. In other words, if we assume that the strip as it leaves the rollers 22 and 23 has a thickness of one-eighth of an inch, then the strip after it has left the rollers 25 and 26 would have a thickness at its thinnest portion of one-sixteenth of an inch and a thickness of three-sixteenths at its thickest portion. There is, thus, a building up process whereby the strip after leaving the rollers 22 and 23 is both thinned out and thickened. I find that it would not be practical to have the strip as it leaves the rollers 22 and 23 of a thickness equal to the thinnest portion of the finished shingle because under those conditions there would not be enough material to leave an even surface when said material is thickened by the action of the rollers 25 and 26. It will be noted that the advantage of having the rollers 25 and 26 travel at a greater peripheral speed as the lineal speed of the strip leaving the rollers 22 and 23 prevents a stretching to any appreciable extent of the skin which has in the previous rolling process been formed upon the exterior of the plastic material.

It will be understood that the lines $a$ and $b$ are merely imaginary lines traced upon the drawings for the purpose of description. But I preferably provide the outer surface of the roller 25 with an outwardly projecting blade or rib 30 along each of the lines $b$, which serves as a knife to sever the strip transversely in its thinnest portion, thereby dividing the strip into sections or gates as shown in Fig. 6, each of these sections being thickest along the transverse center line $a'$ and having an upper surface which converges toward the lower surface on both sides of this line to the margin $b'$ of this section or gate. The section or gate may be subsequently severed along the lines $a'$ by any suitable means to produce a set of completed, wedge-shaped shingles.

The rollers may be made of sufficient length and the strip may be of sufficient width to allow it to be divided longitudinally, so that each gate or section may not only be sub-divided transversely along the line $a'$, but it may also be sub-divided along longitudinal lines $c$, whereby each half of the gate will constitute a series of shingles D of definite width, the combined width being of course substantially equal to the width of the strip before it is cut. The cutting operation along the line $c$ may be performed by a series of annular blades or ribs 31, projecting outwardly from the periphery of roller or cylinder 25', as shown in the modification of Fig. 5. Additional annular blades 32 may be provided near each end of the roller 25', for the purpose of trimming the margins of the strip. But I preferably do not employ a blade or knife along the line $a$ of this cylinder, for the reason that the material being thick at this point and still sufficiently plastic to be molded into wedge-shaped sections, blades of sufficient width to cut through it would tend to mutilate the margins or butt ends of the shingles, not only by adhesion to the material, but by reason of the fact that these wider blades would necessarily commence to enter the material at a considerable distance from the vertical center line of the roller axis, and after entering the material would swing to and beyond the vertical position until carried by the roller out of contact with the strip. Further, the edge of the blade, preparatory to lifting the strip at an angle to the vertical line of the roller axis, would project under the material at one side of the line of severance, and would thus additionally tend to lift and mutilate the butt ends of the shingles. For these reasons, I prefer to cut the sections, illustrated in Fig. 6, along the lines $a'$ after the material has been fully cooled and seasoned, although it already has been cut along the lines $b'$.

All of the rollers, including the initial feeding rollers 3 and 4 and the shaping cylinders 25 and 26, together with the inervening pairs of rollers, are preferably chilled to prevent the material from adhering thereto. As soon as the material contacts with the chilled surface of the roller, the contacting surface of the material is chilled and this tends to form a skin thereon which has greater cohesion with the plastic content of the strip, than the adhesion of the strip to the metal surface of the roller. To facilitate chilling the rollers, I make them hollow and provide for a circulation of cold water therethrough. The water may be passed into the rollers through tubular supporting shafts 35. The central portions of the shafts are closed, as clearly illustrated in Fig. 5, but the respective end portions are tubular and provided with interior ports 36 and 37 respectively, whereby the water may enter through one port 36, the water passing out near the other end of the cylinder through the port 37, and through the outlet end of the shaft 35.

It will also be observed that the bearing blocks 40 for the shafts 35 of one roller in each set are slidingly mounted in frame members 41. The inward movements of these blocks are limited by stops 42, whereby the approach of the rollers of each set toward each other is positively limited. The outward or separating movement of the bearing blocks is opposed by springs 44, each interposed between a portion of the frame and the corresponding bearing block. These springs have sufficient pressure so that under ordinary circumstances they will not yield. But if hard material, such as a stone or clinker is encountered, they will yield and allow it to pass. The bearing blocks 40' for the shafts 35' of the opposing roller in each set, are preferably fixed.

All the rollers are positively driven by means of sprocket chains 47 and gear wheels 48, proportioned and arranged as above stated, to drive the rollers with increased peripheral speed. The driving chains and gearing being of ordinary construction, detailed description is deemed unnecessary.

Each gate of shingles delivered from rollers 25, 26, is preferably received upon a belt conveyer 50, whereby it is carried within reach of workmen who remove it and place it in a pile for seasoning purposes. Where the blades 31 are employed on the roller or cylinder 25, the gate will of course be separated along the lines $c$, but the shingles will still be connected in pairs by their butt ends along the line $a'$ (Fig. 6). The material will have cooled and hardened sufficiently to allow it to be lifted and piled without danger of tearing or breaking.

Referring now to Fig. 5, it will be observed that a cylinder 25' is illustrated, which is similar in all respects to the cylinder 25, except as follows. It is larger and is provided with a correspondingly increased number of broad open corrugations on its outer surface or periphery. By using cylinders of large diameter, I am able to reduce the curvature and thus secure a greater area of contact with the material. The rotation of the cylinder is correspondingly slow, although as above stated, the peripheral speed is almost the same as that of the other rollers. In practice I find that I get good results if the rolls 22 and 23 travel about twenty-five revolutions per minute and the roll 25 travels ten revolutions per minute, the rolls 22 and 23 having a diameter of twelve inches and the roll 25 having a diameter of thirty-six inches. Therefore, within reasonable limits, the larger cylinder is preferred. In this construction, I have not only shown the projecting blades or ribs 30 along each of the lines $b$, as above described, with reference to Figs. 1 to 4 inclusive, but I also have illustrated projecting blades or ribs 50′ along the lines $a$. These blades 50′ project outwardly far enough so that their outer margins travel in the same cylindrical path as that described by the outer margins of the blades 30. In this construction, therefore, the strip will be completely separated into shingles D, D, instead of forming a gate to be subsequently cut.

Where the material is of such consistency that tearing or mutilation of the butt ends of the shingles is unlikely, these deep cutting blades 50′ may be successfully used, either on the small rollers or the large rollers, but particularly upon the large rollers, since the arc of curvature is so large that the blades do not deviate materially from a vertical position while embedded in the material.

I attach great importance to the fact that my compression roller is divided longitudinally into peripheral bands, each of which is arcuate in cross section with a surface which has a progressively increasing radius. These bands alternate with similar bands which have a progressively decreasing radius and each band having a width equal to the desired length of a shingle. This construction causes the surface of the roller to alternately approach and recede from the other roller when the rollers are revolved and the material is pressed out of the thin portion of the resulting strip backwardly or toward the point from which the strip originates. Owing to the fact that the chilling effect of the rollers upon the strip has provided the strip with a skin which is harder and more tenacious than the interior, it is obvious that as the interior is pressed backwardly, there will be more of a tendency to bulge at the center than at the edges of the strip, this bulging tendency being of course overcome as the strip passes between the rollers, while the increased space, provided as the roller 25 recedes from the roller 26, accommodates the excess material while pressing it with reduced pressure toward the side margins of the strip, the force being insufficient to materially widen the strip. This is an important feature, since after the skin has been formed upon the strip, it is desirable not to break or crack it.

This application is a substitute application for my application Serial No. 83,714, filed March 13, 1916.

What I claim is:

1. A machine for making composition shingles, including a compression roller divided longitudinally into alternate bulging and depressed portions to form a wave-like surface, the radial dimensions in any given longitudinal plane radiating from the axis of the roller being equal, and the radial lines in any cross-sectional plane continuously varying in length, whereby said roller is adapted to compress a strip of plastic material into wedge shaped members, substantially as described.

2. A machine for making composition shingles, including a compression roller divided longitudinally into peripheral bands arcuate in cross section and having a progressively increasing radius, alternating with similar bands having a progressively decreasing radius, each of said bands having a width equal to the desired length of a shingle.

3. A machine for making composition shingles, including the combination of a set of rollers disposed in proximity to each other and in parallel relation, and having surfaces which relatively approach and recede from each other to an equal extent throughout the length of the rollers as said rollers revolve, and means for chilling said surfaces from the interior of said rollers.

4. In a machine of the character described the combination with means for feeding a strip of plastic material of a given thickness and at a given speed, of a shaping roll having a peripheral speed the same as the lineal speed of travel of the strip, and having its outer contour flattened whereby said strip is acted upon by said shaping roll, said strip is formed into sections having wave or wedge-like cross section, the thickest portion of said sections being thicker than the thickness of the strip.

5. In a machine of the character described, the combination with means for feeding a strip of plastic material of a given thickness and at a given speed, of a smooth surfaced shaping roll having a peripheral speed the same as the lineal speed of travel of the strip, and having its outer contour flattened whereby when said strip is acted upon by said shaping roll, said strip is formed into sections having wave or wedge like cross-section, the thickest portion of said sections being thicker than the thickness of the strip.

6. In a machine of the character described, the combination with means for feeding a strip of plastic material of a given thickness and at a given speed, of a smooth surfaced chilled shaping roll having a peripheral speed the same as the lineal speed of travel of the strip, and having its outer contour flattened whereby when said strip is acted upon by said shaping roll, said strip is formed into sections having wave or wedge like cross-section, the thickest portion of said sections being thicker than the thickness of the strip.

7. In a machine of the character described, the combination with a pair of rolls for feeding a strip of plastic material and forming the same to be of a given uniform thickness, of a pair of shaping rolls having a peripheral speed the same as the peripheral speed of said feeding rolls, one of said shaping rolls having its outer contour flattened whereby when said strip is acted upon by said shaping roll, said strip is formed into sections having wave or wedge like cross-section, the thickest portion of said sections being thicker than the thickness of the strip.

8. In a machine of the character described, the combination with means for feeding a strip of plastic material of a given thickness and at a given speed, of a shaping roll having a peripheral speed the same as the lineal speed of travel of the strip, and having its outer contour flattened whereby when said strip is acted upon by said shaping roll, said strip is formed into sections having wave or wedge like cross-section, the thickest portion of said sections being thicker than the thickness of the strip, a hopper adapted to supply plastic material, a measuring roll adapted to control the amount of plastic material fed from the said hopper and to form the said material into a strip, and means for feeding said strip from said measuring roll to said feeding means.

9. In a machine of the character described, the combination with means for feeding a strip of plastic material of a given thickness and at a given speed, of a shaping roll having a peripheral speed the same as the lineal speed of travel of the strip, and having its outer contour flattened whereby when said strip is acted upon by said shaping roll, said strip is formed into sections having wave or wedge like cross-section, the thickest portion of said sections being thicker than the thickness of the strip, and a plurality of thinning rolls interposed between said shaping roll and said feeding means to cause a gradual reduction in thickness of the said strip in its passage from said measuring roll to said feeding means.

10. In a machine of the character described the combination with a hopper adapted to supply plastic material, a measuring roll adapted to control the amount of plastic material taken from the said hopper and to form the same into a strip, feeding means for feeding said strip and for reducing the thickness of the material of said strip, and a shaping roll having its outer contour flattened whereby when said strip after leaving said feeding means is acted upon by said shaping roll, said strip is formed into sections having wave or wedge-like cross section.

11. In a machine of the character described the combination with a hopper adapted to supply plastic material, a measuring roll adapted to control the amount of plastic material taken from the said hopper and to form the same into a strip, feeding means for feeding said strip and for reducing the thickness of the material of said strip, said means being chilled whereby to form a skin upon the said plastic material, and a shaping roll having its outer contour flattened whereby when said strip after leaving said feeding means is acted upon by said shaping roll, said strip is formed into sections having wave or wedge like cross section.

12. In a machine of the character described the combination with a hopper adapted to supply plastic material, a measuring roll adapted to control the amount of plastic material taken from the said hopper and to form the same into a strip, feeding means for feeding said strip and for reducing the thickness of the material of said strip, said means being chilled whereby to form a skin upon the said plastic material, a shaping roll having its outer contour flattened whereby when said strip after leaving said feeding means is acted upon by said shaping roll, said strip is formed into sections having wave or wedge like cross section, and a plurality of sets of thinning rolls interposed between said measuring roll and said feeding means whereby the thickness of said strip in its passage from said measuring roll to said feeding means is gradually reduced.

In witness whereof I hereunto subscribe my name this 10th day of October, A. D. 1919.

OSCAR ALTPETER.